United States Patent
Van Wolde et al.

(10) Patent No.: US 10,485,181 B2
(45) Date of Patent: Nov. 26, 2019

(54) DRIVE UNIT FOR A GRAIN ELEVATOR AND GRAIN ELEVATOR ARRANGEMENT

(71) Applicant: Arnold Jaeger Holding GmbH, Hannover (DE)

(72) Inventors: Harm-Jan Van Wolde, Huizinge (NL); Nicholas Carlson, Stanchfield, MN (US); Sebastian Jaeger, Hannover (DE)

(73) Assignee: Arnold Jaeger Holding GmbH, Hannover (DE)

( * ) Notice: Subject to any disclaimer, the term of this patent is extended or adjusted under 35 U.S.C. 154(b) by 0 days.

(21) Appl. No.: 16/246,677

(22) Filed: Jan. 14, 2019

(65) Prior Publication Data
US 2019/0218037 A1    Jul. 18, 2019

(30) Foreign Application Priority Data

Jan. 15, 2018 (EP) .................................. 18151716

(51) Int. Cl.
*A01F 12/46* (2006.01)
*A01D 61/02* (2006.01)
(Continued)

(52) U.S. Cl.
CPC .............. *A01F 12/46* (2013.01); *A01D 61/00* (2013.01); *A01D 61/02* (2013.01); *B65G 17/126* (2013.01); *B65G 19/14* (2013.01); *B65G 33/34* (2013.01); *B65G 47/58* (2013.01); *B65G 2201/042* (2013.01); *B65G 2812/011* (2013.01)

(58) Field of Classification Search
CPC ...... B65G 15/44; B65G 17/126; B65G 19/14; B65G 23/06; B65G 33/14; B65G 33/265; B65G 33/32; B65G 33/34; B65G 47/58; B65G 2201/042; B65G 2812/011; B65G 2812/02227; B65G 2812/02237;
(Continued)

(56) References Cited

U.S. PATENT DOCUMENTS 5,143,203 A * 9/1992 Hinner .................. B65G 17/126
198/708
5,186,312 A * 2/1993 Ambs .................... B65G 19/14
198/716

(Continued)

FOREIGN PATENT DOCUMENTS

DE    10 2012 007 637 A1    10/2013
DE    10 2016 217 169 A1    3/2017
(Continued)

*Primary Examiner* — Gene O Crawford
*Assistant Examiner* — Keith R Campbell
(74) *Attorney, Agent, or Firm* — Collard & Roe, P.C.

(57) ABSTRACT

A drive unit for a grain elevator, in particular for agricultural machines, has a drive wheel operatively connected to a screw conveyor for conveying crop into the grain elevator. The drive wheel is provided with a retainer which may be engaged in a positive locking and/or friction-type connection with a continuous tension device of the grain elevator provided with one or more paddles so as to drive the continuous tension device. Several openings are provided in the drive wheel between the arms holding the retainer in such a way that this allows or facilitates crop conveyed by the screw conveyor into the grain elevator along a direction of conveyance to flow through the drive wheel.

21 Claims, 4 Drawing Sheets

(51) Int. Cl.
  *B65G 17/12*    (2006.01)
  *B65G 19/14*    (2006.01)
  *B65G 47/58*    (2006.01)
  *A01D 61/00*    (2006.01)
  *B65G 33/34*    (2006.01)

(58) Field of Classification Search
  CPC .......... B65G 2812/02247; A01F 12/46; A01D 61/002; A01D 61/008; A01D 61/02; A01D 61/00
  See application file for complete search history.

(56) References Cited

U.S. PATENT DOCUMENTS

| | | | |
|---|---|---|---|
| 6,053,811 A | | 4/2000 | Johnson et al. |
| 6,142,290 A | * | 11/2000 | Tagliaferri ............. B65G 15/52 198/699 |
| 8,801,514 B1 | * | 8/2014 | McCully ................ A01F 12/46 460/114 |
| 8,851,276 B2 | | 10/2014 | Strieker |
| 9,017,001 B1 | * | 4/2015 | Dueck .................... B65G 65/32 414/298 |
| 9,516,817 B2 | * | 12/2016 | Temple ................... A01F 12/46 |
| 9,676,557 B2 | | 6/2017 | Boydell et al. |
| 10,028,444 B2 | * | 7/2018 | McCully ................ A01F 12/46 |
| 2014/0106831 A1 | | 4/2014 | Wilde Von Wildemann |
| 2016/0057926 A1 | * | 3/2016 | Roe ........................ A01F 12/46 56/14.6 |
| 2016/0135371 A1 | * | 5/2016 | Vandevelde ........... A01F 12/46 460/114 |

* cited by examiner

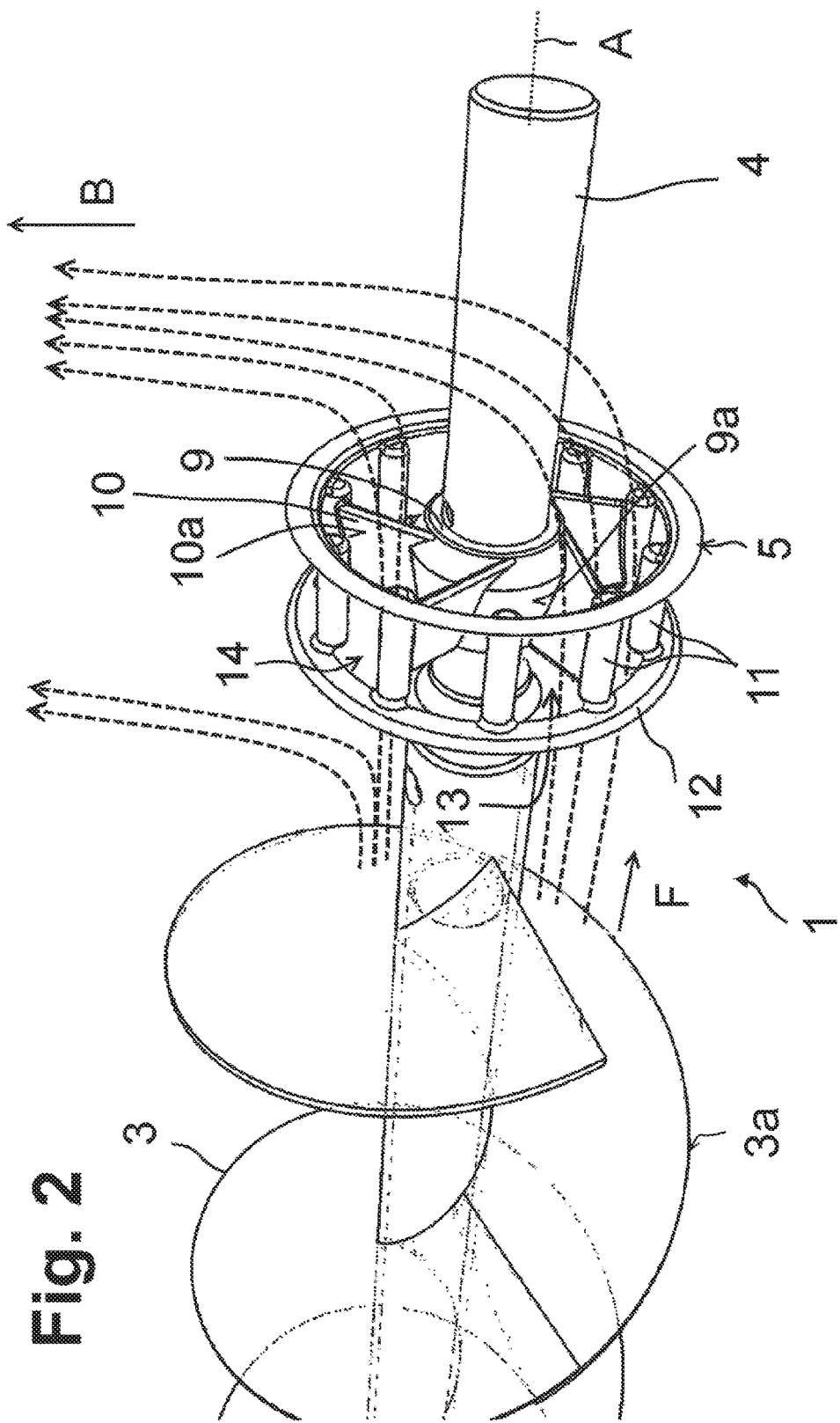

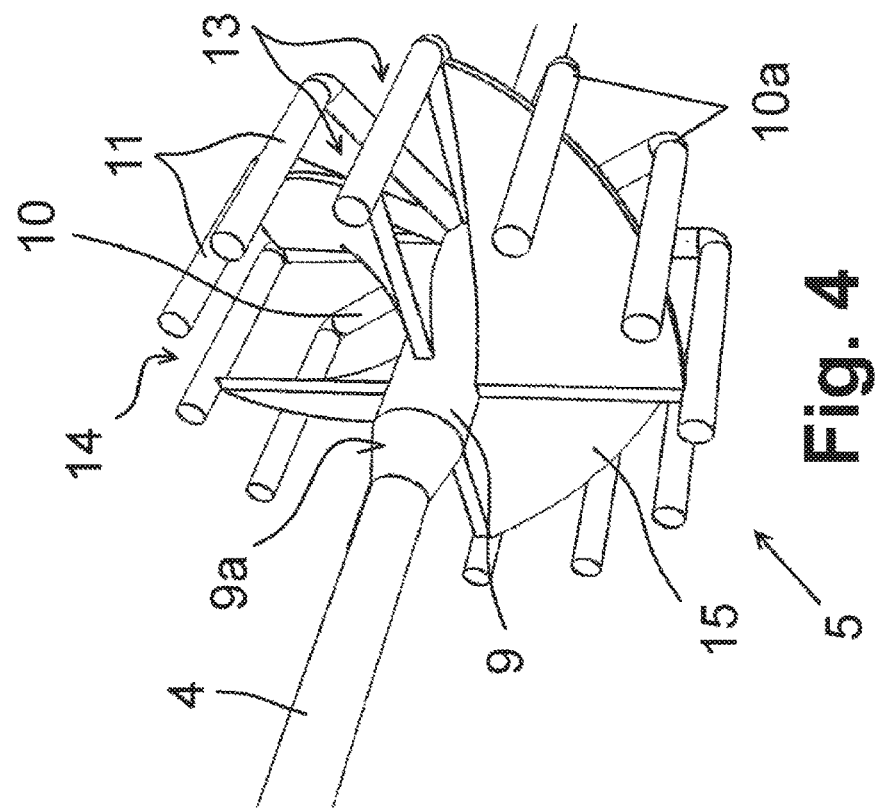
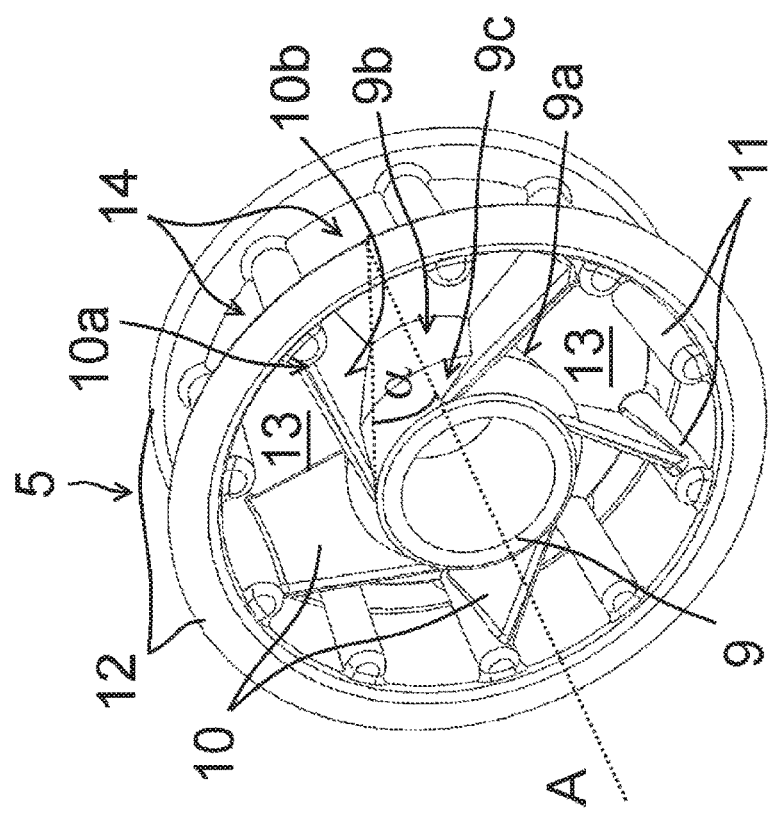

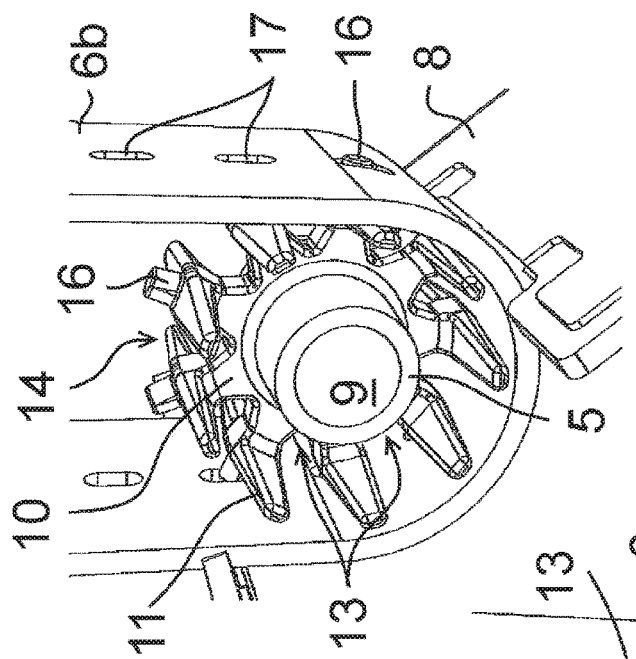
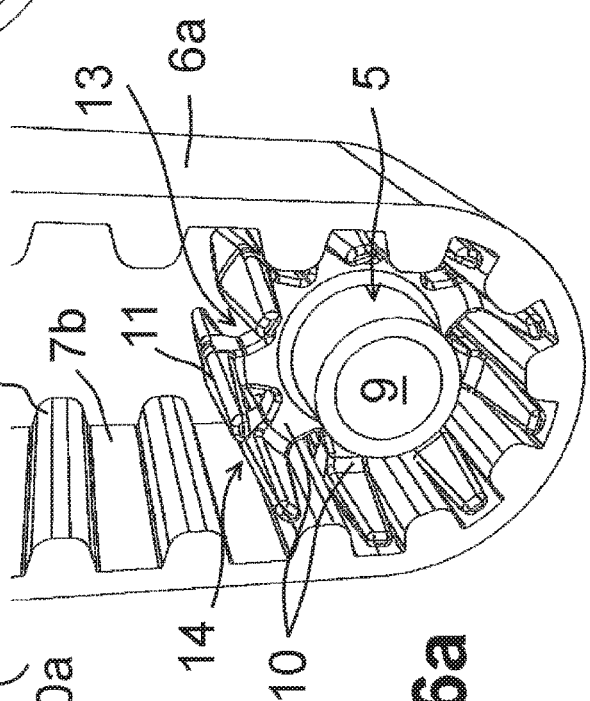
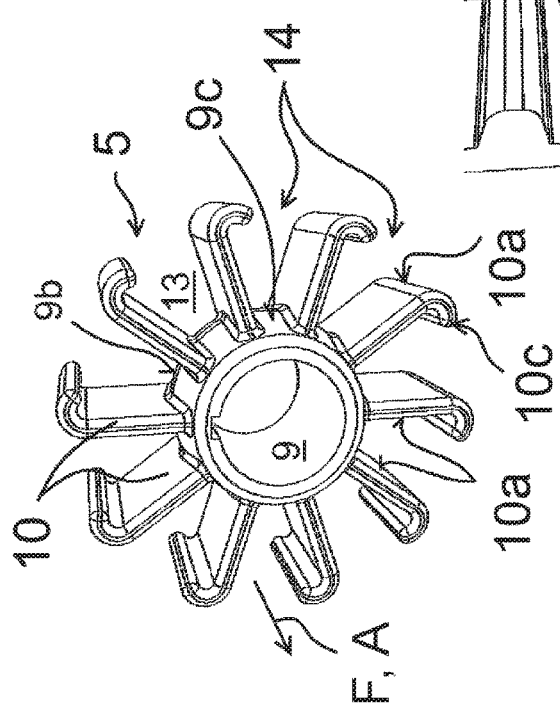

DRIVE UNIT FOR A GRAIN ELEVATOR AND GRAIN ELEVATOR ARRANGEMENT

CROSS REFERENCE TO RELATED APPLICATIONS

Applicant claims priority under 35 U.S.C. § 119 of European Application No. 18151716.0 filed on Jan. 15, 2018, the disclosure of which is incorporated by reference.

BACKGROUND OF THE INVENTION

1. Field of the Invention

The Invention relates to a drive unit for driving a grain elevator as well as a grain elevator arrangement comprising such a drive unit, in particular for agricultural machines.

2. Description of the Related Art

Agricultural machines, for example harvesters, comprise various conveyor means capable of conveying crop, e.g. corn grains or cereal grains, in the harvester to various positions. Hereby, the crop may be conveyed e.g. via a grain elevator vertically upwards towards a grain tank or via an inclined conveyor from a crop attachment into the interior of the harvester. For driving the conveyor means continuous tension means, e.g. chains or belts are provided, running on drive wheel s, e.g. chain pinions or belt pulley and being driven by these in a frictionally engaged and/or positive locking manner so as to transmit a torque onto the tension means.

For the purpose of conveying crop by a grain elevator one or more chains guided in a housing are provided attached to which are paddles or paddle wheels. When the chains are driven via a drive wheel the paddles or paddle wheels ensure that crop fed to the grain elevator from below is conveyed upwards. Hereby, it is a disadvantage that the driven chains and chain pinions are very noisy when the grain elevator is in operation and, moreover, that the crop can build up on the chain pinions because these are located in the path of conveyance of the crop in the lower region of the grain elevator, thereby constituting a resistance for the "flowing" crop. Moreover, crop may be damaged when it gets caught between the chain pinion and the chain and thereby crushed. Furthermore, the material pairings of the chains and chain pinions are subject to wear limiting durability as well as liability.

An exemplary harvester is described, for example, in the document DE 10 2012 007 637 A1. A grain elevator with paddles mounted on a chain driven by positive locking, is described, for example, in the citation DE 10 2016 217 169 A1.

SUMMARY OF THE INVENTION

It is the object of the invention to provide a drive unit for a grain elevator by means of which the conveying of crop in or through the grain elevator can be ascertained in a simple, durable, and reliable manner. Another object of the invention is to provide a grain elevator arrangement comprising such a drive unit.

This task is solved by a drive unit according to claim 1 as well as a grain elevator arrangement according to claim 17. Preferred further developments are specified in the subclaims.

According to this it is provided to introduce several openings into a drive wheel in operative connection with a screw conveyor, said openings being designed such that crop conveyed by the screw conveyor into the grain elevator is enabled to pass and/or facilitated in passing through the drive wheel.

This already results in the advantage that the drive wheel, which is required for driving a continuous tension means in the grain elevator and, to that end, is located in the path of conveyance of the crop, offers merely little resistance to the "flowing" crop. This is achieved in that the crop is able to pass with little resistance through the openings from the side of the drive wheel facing the screw conveyor to the opposite side of the drive wheel from where it can be further conveyed. This results in a reduced build-up of crop in front of the drive wheel so that overall maintenance labour of the grain elevator can be minimised. By virtue of the rotational movement of the drive wheel it is possible, depending on the disposition of the arms type, to additionally press, in a pump action manner, or convey the crop through the openings of the drive wheel in the way of an axially conveying impeller wheel or worm wheel, thereby facilitating the movement of the crop through the drive wheel.

To that end, the openings are arranged in an area of the drive wheel where there are arms fixing or positioning retainer means on a perimeter of the drive wheel. The retainer means serve to guarantee a frictionally engaged and/or positive locking engagement with a continuous tension means of the grain elevator in such a way that the continuous tension means is driven be the powered drive wheel. Thus, an area of the drive wheel is left out which is not essentially required because sufficient fixation or engagement of the retainer means can be achieved via the arms so that these can securely and reliably retain the continuous tension means in a frictionally engaged and/or positive locking manner.

In order to achieve this the openings, depending on the design and application, may account for, for example, a share of between 30% and 85%, in particular, between 50% and 70%, preferably 65%, of the surface covered by the drive wheel. Such a share of the surface guarantees the stability of the drive wheel or a sufficient grip for the retainer means even under load so that, advantageously, a durable retaining of the continuous tension means can be ascertained while at the same time minimizing the resistance offered to the conveyed crop.

Preferably, to that end, the drive wheel may comprise pins having a rounded and/or bevelled cross section as retainer means which are held on their perimeter or positioned respectively by the arms. The pins may be designed to taper towards the outside. On the side of the circumference gaps are provided between the pins. Hereby, according to one embodiment, cams of a continuous tension means designed as a cam belt may each engage with the gaps in such a positive locking manner that the cams are retained by the powered drive wheel and the cam belt of the grain elevator is driven thereby. According to an alternative embodiment of a continuous tension means as a flat belt, this may be engaged with the pins of the drive wheel merely via a frictionally engaged connection so that the flat belt, when provided with sufficient tension, is also retained and driven by the drive wheel.

Hereby, paddles are arranged on the respective continuous tension means, said paddles ensuring in a housing of the grain elevator that the crop fed to the grain elevator is moved perpendicularly upwards, e.g. in the direction of a grain tank. Hereby, preferably, the continuous tension means or, respectively, the cam belt or the flat belt are made of network polymer reinforced by a fabric inlays. The use of such a cam belt or flat belt markedly reduces the noises of the grain elevator compared to a chain drive. Moreover, such a system increases the reliability and durability based on the low-wear material pairings, i.e. drive wheel and tension means or, respectively, cam belt or flat belt. To that end, the drive wheel may be produced, for example, as a single piece from injection moulded plastics.

In order to increase the yield of the conveyed crop and to reduced maintenance expenditure even more, it is provided, preferably, to connect the gaps between the retainer means or, respectively, the pins to the openings. This helps to achieve that less crop will become jammed between the tension means, in particular, the flat belt or a cam of the cam belt, and the drive wheel rendering it useless and also littering the drive wheel. Rather, crop present in the gap automatically also enters the openings and is thus prevented from lying between the flat belt or the cams of the cam belt and the drive wheel.

In order to further support this effect, the pins are preferably designed having a rounded cross section, e.g. with a round or an oval cross section surface. This can, advantageously, cause crop present on the pins to automatically move to the gaps and be carted away through the openings. Thus, a jamming of crop between the drive wheel and the tension means, in particular, the flat belt or the cam belt respectively, can be avoided.

According to one embodiment it is provided that the arms are designed flat so that lateral faces of the arms are aligned parallel or slightly inclined with respect to the direction of conveyance of the crop and extend starting from a hub of the drive wheel outwards in a radial direction and are connected at their outer ends to one of the retainer means.

Due to the flat design essentially aligned in parallel with the direction of conveyance, a build-up of crop can be avoided since the crop coming from the screw conveyor can "flow" unobstructed along the lateral faces of the arms. Consequently, merely the frontal areas of the arms remain which may be designed, however, preferably narrow in comparison and, therefore, provide merely minimum resistance to the crop.

In order to facilitate the crop passing through the openings, the arms or, respectively the lateral faces of the arms may be rotated about an angle between 5° and 75°, preferably 65°, against a longitudinal axis running through the hub of the drive wheel, which approximately represents the direction of flow or the direction of conveyance respectively in the region of the drive wheel, so that the lateral faces of the arms no longer run in parallel with the longitudinal axis. Hereby, when the drive wheel is powered, a pump-type effect can be achieved so that the crop is additionally pressed or "pumped" respectively through the drive wheel into the direction of conveyance, in a manner similar to an axially conveying impeller wheel or a worm wheel. This effect can be further improved by additional distortion of the arms. To that end, for example, the angle of the lateral faces may correspond to the angle of the helical gearing of the threaded screw conveyor so that the helical gearing of the threaded screw conveyor—with one interruption—is virtually continued in the drive wheel. The conveyance velocity of the crop by means of the screw conveyor may be essentially maintained also in the drive wheel.

According to an alternative embodiment of the drive wheel, the arms of the drive wheel may also be designed having a rounded and/or bevelled cross section, e.g. a round or an oval cross section, or a rectangular cross section with possibly rounded or bevelled edges and extend starting from a hub of the drive wheel outwards in a radial direction with the arms being connected at their outer ends to one of the retainer means, preferably, as a single piece. Thus, a T-shaped or an L-shaped unit from the arm and the retainer means connected thereto can be produced in a simple manner with the retainer means additionally being designed as tapering towards the outside. Due to the rounded and/or bevelled cross section both of the arm and of the retainer means only a small resistance is created for the crop which moves there-between through the openings or gaps respectively. In this embodiment of the drive wheel, too, it can be used to drive a cam belt or a flat belt as continuous tension means.

According to another alternative embodiment of the drive wheel it may be provided to have flatly designed arms of the drive wheel to pass into the retainer means directly at their ends. Then, a retainer means may, for example, be formed by a re-shaped, e.g. offset or bent, end of an arm. Hereby, the re-shaped ends enlarge the contact surface for the frictionally engaged and/or positive locking clamped continuous tension means on the drive wheel. The openings as well as the gaps according to the invention are provided between the arms re-shaped at their ends so that this also enables and/or facilitates a flow of crop conveyed by the screw conveyor into the grain elevator through the drive wheel.

In addition to the arms, in the region of the openings guide ribs angled or wound in relation to a longitudinal axis running through the hub of the drive wheel, said guide ribs facilitating a conveyance of the crop through the openings of the drive wheel by means of a pump-like effect as described earlier for the angled or wound flat arms. The design of the guide ribs, too, may be geared to the design of the helical gearing of the screw conveyor.

Preferably, it is further provided that a hub outer side of the bub of the drive wheel is designed at least partially as sloping towards the screw conveyor and/or away from the screw conveyor or, respectively, in an axial direction towards one or towards both sides so as to prevent blocking and/or jamming of crop in the region of the hub of the drive wheel. According to this, in a first region of the hub which is closest to the screw conveyor the outer side of the hub may be designed, at least in part, as sloping towards the screw conveyor and/or in a second region of the hub adjacent to the first region of the hub in the direction away from the screw conveyor, at least in part, as rising in the direction of the screw conveyor whereby both regions merge as monotonously as possible.

This can lead to further improvement of the flowing behaviour of the crop because the crop does not build up at the side of the drive wheel facing the screw conveyor and, at the same time, is able to flow off from the openings of the drive wheel in the direction of conveyance without getting jammed.

Preferably, it may further be provided for the drive wheel to comprise a washer disc in the region of the outer perimeter, the end of said disc being connected to the retainer means, whereby the washer disc protrudes outwards in a radial direction beyond the retainer means in such a manner that a continuous tension means mounted on the drive wheel is guided in an axial direction. Thus, any lateral displacement of the tension means can be avoided guaranteeing reliable operation of the grain elevator.

Additionally, the washer discs may also hold individual retainer means that are not immediately connected via one of the arms to the hub whereby these retainer means are disposed on the same perimeter as the retainer means held by the arms. This helps to guarantee a reliable and/or positive locking transmission of power or torque transmission respectively on the tension means by means of a sufficient number of retainer means. Hereby, the further retainer means are connected to the hub, at least indirectly, via the washer disc and the retainer means held by the arms. At the same time, the number of the arms can be reduced since, for example, only every other or third or fourth etc. retainer means is connected directly via an arm to the hub. Consequently, for example, only a total of two or three arms may be provided to hold the retainer means. Hereby, the surface of the opening can be increased benefiting the flow of crop.

Preferably, it may further be provided to arrange guide lugs on the retainer means, at about the centre and extending radially outwards, said lugs being able to engage with the continuous tension means. This allows to guarantee a synchronous run of the drive wheel and the continuous tension means, in particular, in the event of a purely friction-type connection but also a positive locking connection between the drive wheel and the continuous tension means and also—complementary or as an alternative to the washer discs—avoid any axial displacement of the continuous tension means on the drive wheel.

According to the invention, further, a grain elevator arrangement comprising a grain elevator and a drive unit driving the afore-mentioned grain elevator is proposed, with the drive wheel of the drive unit being engaged with the continuous tension means of the grain elevator in such a positive locking and/or friction-type connection that rotating the screw conveyor as well as the drive wheel in operative connection therewith also drives the continuous tension means, allowing crop conveyed by the screw conveyor into the grain elevator to be conveyed by the paddles on the continuous tension means through the grain elevator, whereby the several openings allows and/or facilitates crop conveyed into the grain elevator by the screw conveyor to flow through the drive wheel.

Hereby, in accordance with an alternative, the continuous tension means is designed as a cam belt with cams and gaps located in-between whereby the cams can engage in a positive locking manner with the gaps between the retainer means in order to retain the cams of the cam belt by means of the powered drive wheel to thereby drive the cam belt of the grain elevator.

According to an alternative embodiment the continuous tension means is designed as a flat belt retained through friction by the retainer means of the drive wheel, i.e. there is a friction-type connection between the two. In addition, it is possible to ensure synchronous running of the drive wheel and the tension means via optional guide lugs on the retainer means, in particular, with this purely friction-type connection.

BRIEF DESCRIPTION OF THE DRAWINGS

The Invention will be further illustrated below by means of embodiment examples. The following is shown:

FIG. 2 a detailed view of a drive wheel on a screw conveyor;

FIG. 3 a detailed view of the drive wheel according to FIG. 2;

FIG. 4, 5, 6*a*, 6*b* alternative embodiments of the drive wheel of the drive unit according to the invention.

DETAILED DESCRIPTION OF PREFERRED EMBODIMENTS

Figure 1:
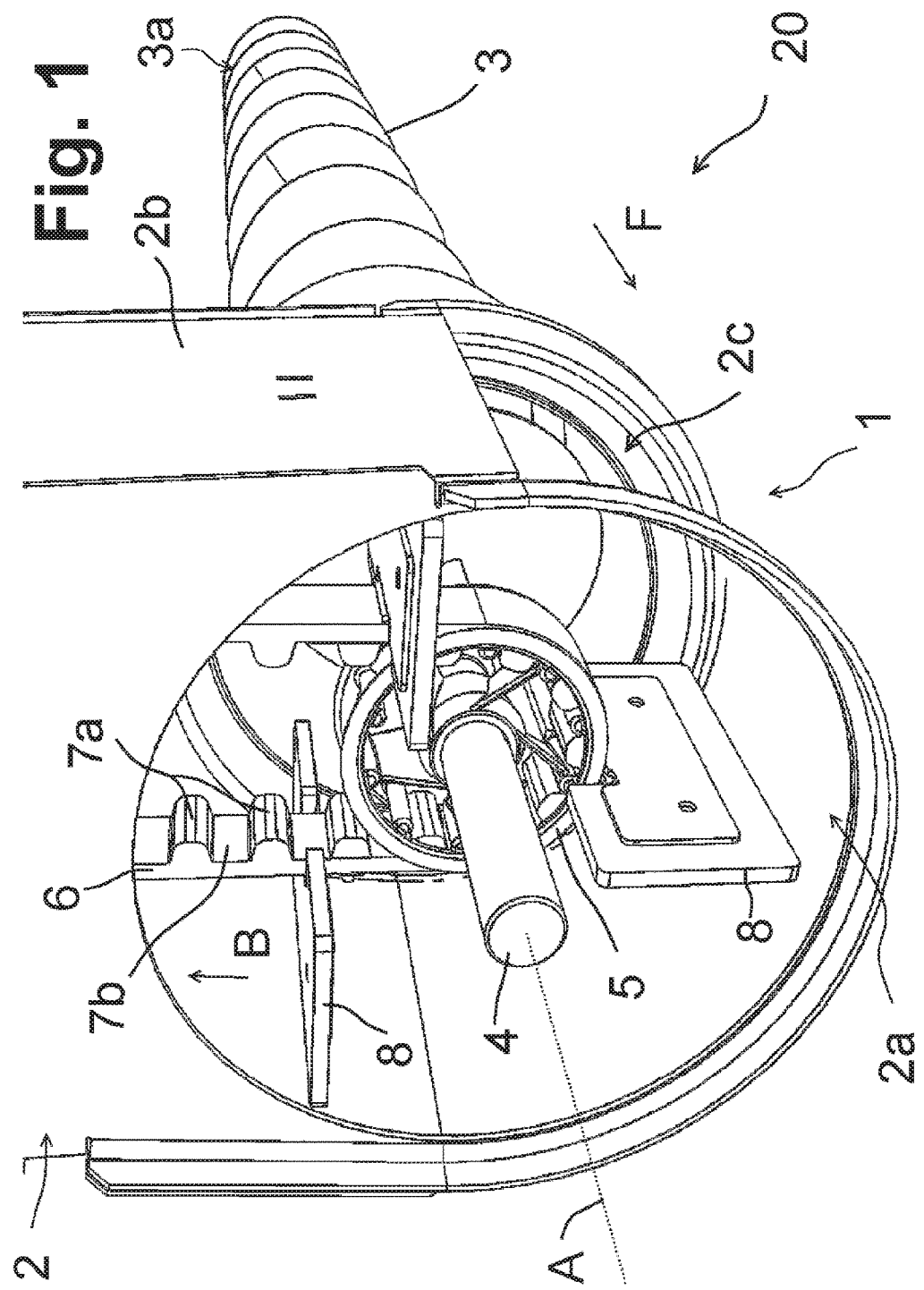
FIG. 1 perspective views of a drive unit for a grain elevator.

According to FIG. 1 a drive unit 1 for a grain elevator 2 is shown, said grain elevator 2 serving to transport crop, e.g. corn or cereal grains, conveyed via a screw conveyor 3 with helical gearing 3*a* in the direction of a grain tank not shown here. To that end the screw conveyor 3 is rotated by a drive—not shown—at a pre-determined velocity via a shaft 4 about a longitudinal axis A so that the crop is conveyed via the helically distorted gearing 3*a* of the screw conveyor 3 in the direction of the grain elevator 2 (direction of conveyance F). Hereby, the grain elevator 2 and the drive unit 1 together form a grain elevator arrangement 20 according to the invention.

In order for crop entering the grain elevator 2 in a lower region 2*a* to be held inside this and conveyed upwards in the direction of the grain tank (see arrow B), the grain elevator 2 is surrounded by a housing 2*b*. The housing 2*b* encloses the grain elevator 2 hereby comprising, in particular a discharge port 2*c* so that crop may be transported from the screw conveyor 3 along the direction of conveyance F into the lower region 2*a*. For cleaning and/or maintenance purposes the housing 2*b* may also be opened at the appropriate locations via a hatch—not shown here.

A drive wheel 5 is mounted on the shaft 4 of the screw conveyor 3 fixed against rotation so that any rotation of the screw conveyor 3 automatically also causes rotation of the drive wheel 5. To that end, the shaft 4 of the screw conveyor 3 protrudes into the lower region 2*a* of the grain elevator 2 in such a way that, according to this embodiment, a continuous cam belt 6*a* (continuous tension means) of the grain elevator 2 can be mounted on the drive wheel 5. The cam belt 6*a* comprises cams 7*a* at pre-determined spacings which are separated by gaps 7*b* and which are in positive locking engagement with the drive wheel 5 in such a way that, when the cam belt 6*a* is taut, any rotational movement of the powered drive wheel 5 is transmitted to the cam belt 6*a*. Hereby, a torque can be transmitted from the powered screw conveyor 3 via the drive wheel 5 also to the cam belt 6*a* so as to also drive the grain elevator 2. The cam belts 6*a* are usually made of networked polymer reinforced by fabric inlays.

Alternatively to the cam belt 6*a* a flat belt 6*b*, not shown for this embodiment example, can be mounted as continuous tension means on the drive wheel 5 according to FIG. 1 to operate the grain elevator 2. The transmission of the torque from the screw conveyor 3 to the flat belt 6*b* then happens, in particular, by means of frictional "engagement" between the drive wheel 5 and the flat belt 6*b*. An embodiment example comprising a flat belt 6*b* is shown in FIG. 6*b*, the description of which will be given below.

In order to effect conveyance of crop through the grain elevator 2 so-called paddles 8, i.e. retainer arms, are mounted on the cam belt 6*a* at pre-determined spacings, said paddles being designed as plates according to FIG. 1 and extend approximately perpendicularly from the cam belt 6*a* towards the outside. These occupy the space in the housing 2*b* of the grain elevator 2 at least in part in such a manner that crop coming from the screw conveyor 3 into the lower region 2*a* of the grain elevators 2 can be transported via the paddles 8 upwards (arrow B) in the direction of the grain tank when the cam belt 6*a* is driven be the drive wheel 5. The arrangement and function of the paddles 8 in the case of a continuous tension means designed as a flat belt 6*b* (s. FIG. 6*b*) is similar.

According to FIG. 2 the drive unit 1 is shown with the drive wheel 5 and the screw conveyor 3 in a detailed view. The drive wheel 5 is mounted, resistant against rotation, via its hub 9 on the shaft 4 so that the drive wheel 5 rotates together with the screw conveyor 3 about the longitudinal axis A. On its perimeter the drive wheel 5 is provided with several pins 11 as retainer means, said pins 11 are spaced apart at a distance corresponding to the partitioning of the cam belt 6a so that the pins 11 can positive lockingly engage with the gaps 7b created between the cams 7a thereby allowing slip-free driving of the cam belt 6a.

From a hub exterior 9a of the hub 9 several flat arms 10 project in a radial direction ab whereby a part of the pins 11 is affixed to outer ends 10a of the arms 10. Further, pins 11 are disposed on the same perimeter of the drive wheel 5, said pins, however, not being held in their position directly via one of the arms 10. Rather, the further pins 11 are held via two washer discs 12 disposed on the ends which are firmly attached to the pins 11 held by the arms 10 so that the further pins 11 are connected at least indirectly via the washer disc 12 also to the arms 10 and the hub 9. According to this embodiment example, merely every other pin 11 is connected directly via an arm 10 to the hub 9. However, versions are conceivable where, depending on the number of pins 11, material and load, only each third or each fourth pin 11 is connected via an arm 10 to the hub 9. Thus, the number of arms 10 may be reduced, for example, to three or merely two.

This bears the advantage that the drive wheel 5 is designed more open as a whole because larger openings 13 for conveyed crop can be created between the arms 10 (see dotted line in FIG. 2). Thus, the crop is obstructed to a lesser extend by the drive wheel 5 during a process of conveyance and is able to "flow" mostly unimpeded into of through respectively the grain elevator 2. Hereby, the covered surface (cross sectional surface) of the openings 13 approximately corresponds to between 40 and 85% of the total surface covered by the drive wheel 5 (cross sectional surface). This at the same time guarantees a transmission of power onto the cam belt 6a via a sufficient number of pins 11 with major loads thereby avoiding "slippage" of the cams 7a at high loads.

Besides positioning and holding a part of the pins 11 the washer discs 12 have the task to avoid axial slippage of the cam belt 6a on the drive wheel 5, i.e. the washer discs 12 act as lateral stop for the cam belt 6a or, respectively, as belt guide on the auf drive wheel 5.

The pins 11 of the drive wheel 5 also form a type of toothed wheel because the cams 7a of the cam belt 6a mounted on the drive wheel 5 can engage in gaps 14 between the pins 11 and the pins 11 itself can engage in the gaps 7b between the cams 7a in a positive locking manner and the cams 7a are retained by the pins 11 when the drive wheel 5 is powered. This drives the cam belt 6a or, respectively, the grain elevator 2 so as to convey crop into the grain tank. When using a flat belt 6b as continuous tension means this will be driven, in particular, by means of a friction-type connection between the pins 11 and the flat belt 6b so that hereby, too, the grain elevators 2 can be operated (compare FIG. 6b).

Using the gaps 14 between the pins 11 also helps to reduce the region or the surface respectively in which crop can get jammed between the drive wheel 5 and the Cam belt 6a. The rounded, in particular round or perhaps even oval cross sectional surface of the pins 11 supports this because the crop does not stay on the pins 11 when the drive wheel 5 rotates and, therefore, is not or only slights crushed between the cam belt 6a or, respectively, the gaps 7b and the pins 11 leading to very little crop damage The same applies when using a flat belt 6b.

In order to support the process of conveyance of crop through the openings 13 of the drive wheel 5, according to the embodiment in the FIGS. 1 through 3, lateral faces 10b of the arms 10 are angled in relation to the der longitudinal axis A or, respectively, the direction of conveyance F, for example, about an angle $\alpha$ of between 5° and 75°, preferably about 65°. Hereby, the angle $\alpha$ corresponds approximately to the angle of the helical gearing 3a of the screw-type screw conveyor 3 so that the helical gearing 3a of the screw conveyor 3—with one interruption—is virtually continued in the drive wheel 5 so that the flowing properties of the crop in both elements 3, 5 are similar. In addition, a torsion may be introduced into the arms 10. Hereby, the conveyed crop, which upon entering the grain elevator 2 is essentially conveyed in a direction of conveyance F parallel to the longitudinal axis A, upon rotation of the drive wheel 5 is additionally pressed or guided out of the openings 13 towards the opposite side of the drive wheel 5, similar to a pumping action or an axially conveying impeller wheel or worm wheel, to further optimise the conveyance process.

This is further supported by the hub exterior 9a being bevelled towards both sides in such a way that crop coming from the screw conveyor 3 is not build up behind a strongly sloping step or edge in the region of the shaft 4 or the hub 9 respectively while, at the same time, crop getting jammed in the openings 13. Thus, the bevelled hub exterior 9a allows for unimpeded conveyance of crop even in and through the drive wheel 5.

Hereby, the hub exterior 9a in a first region 9b of the hub 9 next to the screw conveyor 3 is designed as sloping towards the screw conveyor 3 so as to avoid a step. This first region 9b merged in the direction away from the screw conveyor 3 into a directly adjacent second region 9c with the second region 9c rising towards the screw conveyor 3 or, respectively, sloping in die opposite direction. This avoids crop getting wedged in the openings 13.

According to a further embodiment example of the drive wheel 5, shown in FIG. 4, no washer discs 12 are present and each pin 11 is associated one arm 10 each. In this embodiment example, the drive wheel 5 is also mounted resistant to rotation on the shaft 4. Starting at the hub 9 of the drive wheel 5 for each pin 11 always one radially protruding arm 10 is provided which is connected to the pin 11 running in parallel to the longitudinal axis A as a retainer means or, respectively, merges into this so that always the arm 10 and the pin 11 each form an L-shaped unit. To that end, the arm 10 can be produced. for example as a single piece together with the pin 11 where both the arm 10 and the pin 11 exhibit a rounded, in particular round or perhaps even oval cross section so as to convey the crop with as little disturbance as possible. Here, too, a gap 14 is created between the pins 11 which is connected to the openings 13 and can positive locklingly engage with the cams 7a of the cam belt 6a. It is also possible to mount a flat belt 6b so as to use this to drive a friction-type connection.

Further, according to the embodiment example in FIG. 4, in addition to the arms 10 guide ribs 15 are provided extending starting from the hub 9 radially outwards and having the same function as the angled arms 10 in the embodiment example according to the FIGS. 1 through 3. To that end, the guide ribs 15 are angled and/or distorted and ensure that the crop coming from the screw conveyor 3 is guided or conveyed respectively in a pump-type manner through the drive wheel 5 with as little disturbance as possible. In addition to the connection to the hub 9, the guide ribs 15 are partially connected to the arms 10 and/or the pins 11 so that the stability of the drive wheel 5 is increased overall. Hereby, the shape of the guide ribs 15 may be adapted to the shape of the helical gearing 3a of the screw conveyor 3 so that the conveyance of crop in the drive wheel 5 happens in a way mostly similar to that in the screw conveyor 3 and, thus, the flow properties in both units are adapted to each other.

According to FIG. 4, the open design of the drive wheel 5 is also continued, with the washer discs 12 being omitted thereby reducing the jamming surface for the conveyed crop. According to this embodiment example, too, it is provided for the hub exterior 9a to be sloped so that the crop pass into the drive wheel 5 and through the helical guide ribs 15 unimpeded for the most part. According to this embodiment example, however, for guiding the mounted cam belt 6a a washer disc 12 may be provided in principle.

According to a further embodiment of the drive wheel 5, shown in the FIG. 5, the drive wheel 5 comprises flat arms 10 the outer ends 10b of which are always designed as re-shaped ends 10c, hereby, in accordance with this embodiment, being half open or bent in a u-shaped manner respectively. The bent ends 10c increase the contact surface of the outer ends 10b and serves as retainer means for retaining the continuous tension means 6a, 6b which can be mounted thereon in a friction-type or positive locking manner. The openings 13 according to the invention and, at the same time, also the gaps 14 are created between the arms 10 re-shaped at the ends so this also enables and/or facilitates the flow of crop conveyed by the screw conveyor 3 into the grain elevator 2 through the drive wheel 5.

Hereby, the lateral faces 10a which, according to this embodiment, are aligned in parallel to the direction of conveyance F ensure that the crop can flow through the drive wheel 5 unimpeded. In principle, the lateral faces 10a of the arms 10 in this embodiment may, at least in part, be also angled in relation to the direction of conveyance F and/or distorted, in a way similar to the embodiment example according to FIG. 3.

According to a further embodiment of the drive wheel 5, shown in FIG. 6a, it is provided for the arms 10 to have a rectangular cross section with rounded edges and for these to always merge into a pin 11 as retainer means also having a rounded cross section. The respective pin 11 protrudes away towards both sides in an axial direction from the respective arm 10 thereby and tapering slightly axially towards the outside. Thus, a unit made from the arm 10 and the pin 11 designed as a T-shape. A gap 14 is created between the pins 11 of adjacent arms 10 and the openings 13 according to the invention between adjacent arms 10. According to the variation shown in FIG. 6a, a cam belt 6b with cams 7a and in-between gaps 7b is mounted on the so designed drive wheel 5 so as to maintain positive locking and friction-type engagement between the two.

FIG. 6b shows approximately the same embodiment of the drive wheel 5 as in FIG. 6a with the difference that the drive wheel 5 receives a flat belt 6b, in particular, in friction-type engagement, i.e. the flat belt 6b is driven mainly by means of friction. To ensure driving the flat belt 6b drive cams 16, each protruding radially towards the outside, are provided on the pins 11 which cams engage in the flat belt 6b in central openings 17. The openings 17 are designed as elongated holes and serve to optimise the transmission of power from the drive wheel 5 to the flat belt 6b by preventing, by means of the drive cams, slippage of the flat belt 6b driven purely by friction under high load 16. This guarantees a synchronous run between the two. Furthermore, the drive cams 16 may be used to support guidance so that the flat belt 6b does not get displaced in an axial direction in relation to the drive wheel 5.

In principle, the guide cams 16 may be used also in the embodiments having a cam belt 6a so as to support here, too, a synchronous run as well as to enable axial guidance.

LIST OF REFERENCE NUMERALS 1 drive unit
2 grain elevator
2a lower regions of the grain elevator 2
2b housing
3 screw conveyor
3a helical gearing of the screw conveyor 3
4 shaft
5 drive wheel
6a cam belt
6b flat belt
7a cams
7b gaps
8 paddle
9 hub
9a outer side of hub
9b first region of the outer side of hub 9a
9c second region of the outer side of hub 9a
10 arm
10a outer ends of the arm 10
10b lateral face of the arm 10
10c re-shaped ends of the arm 10
11 pin
12 washer disc
13 passage openings
14 gap
15 guide ribs
16 drive cams
17 openings
20 grain elevator arrangement
A longitudinal axis
α angle
B direction of conveyance through grain elevator
F direction of conveyance before grain elevator

The invention claimed is:

1. A drive unit for a grain elevator, comprising a drive wheel which is operatively connected to a screw conveyor for conveying crop into the grain elevator, said drive wheel comprising a first retainer which can be brought into positive locking and/or friction engagement with a continuous tension device of said grain elevator comprising several paddles,
   wherein
   in said drive wheel, between arms holding said first retainer, several openings are provided so as to enable and/or facilitate crop conveyed through said screw conveyor into said grain elevator along a direction of conveyance to flow through said drive wheel.

2. The drive unit according to claim 1, wherein said drive wheel comprises the first retainer, wherein the first retainer comprises pins having a rounded and/or bevelled and/or rectangular cross section, said pins being held perimetrically by the arms, and wherein gaps are provided between said pins, so that
   cams of said continuous tension device designed as a cam belt can positive lockingly engage with said gaps in order to retain said cams by the drive wheel to thereby drive said cam belt of said grain elevator, or said continuous tension device designed as a flat belt can friction engage with said pins so as to retain said flat belt to thereby drive said flat belt of said grain elevator.

3. The drive unit according to claim 1, wherein said arms of said drive wheel are provided each with a re-shaped end, said re-shaped ends form said first retainer, said re-shaped ends each being disposed on a perimeter of the drive wheel and a gap being formed between adjacent re-shaped ends, so that
   cams of said continuous tension device designed as a cam belt can positive lockingly engage with said gaps in order to retain said cams by the drive wheel to thereby drive said cam belt of said grain elevator, or
   said continuous tension device designed as a flat belt can friction engage with said re-shaped ends so as to retain said flat belt to thereby drive said flat belt of said grain elevator.

4. The drive unit according to claim 2, wherein said gaps are connected to said openings so as to prevent crop getting jammed between said continuous tension device and said drive wheel.

5. The drive unit according to claim 1, wherein said arms are designed flat whereby lateral faces of the arms are aligned in parallel or angled in relation to the direction of conveyance of the crop and extend starting from a hub of said drive wheel outwards in a radial direction and are connected, at the outer ends of which, to at least one of said first retainer.

6. The drive unit according to claim 5, wherein said lateral faces of said arms are wound about an angle of between 5° and 75° corresponding to a helical gearing of the screw conveyor in relation to a longitudinal axis running through said hub of said drive wheel so as to facilitate conveyance of the crop through said openings of said drive wheel.

7. The drive unit according to claim 5, wherein said arms are additionally wound.

8. The drive unit according to claim 1, wherein said arms are provided with a rounded and/or bevelled and/or rectangular cross sectional surface and extend starting from a hub of said drive wheel outward in a radial direction and are connected, at the outer ends of which, to at least one of said first retainer.

9. The drive unit according to claim 1, further comprising a unit, wherein the unit comprises at least one of said arms and said first retainer connected thereto to form an L-shape or a T-shape whereby, to that end, the respective first retainer protrudes on one side or both sides in an axial and/or radial direction from said arm.

10. The drive unit according to claim 1, wherein said first retainer tapers in an axial direction towards the outside.

11. The drive unit according to claim 1, wherein guide ribs angled and/or wound in relation to a longitudinal axis running through a hub of said drive wheel are arranged in the region of said openings so as to facilitate conveyance of the crop through said openings of said drive wheel.

12. The drive unit according to claim 1, wherein said openings make up for a share of between 30% and 85% of the surface covered by said drive wheel.

13. The drive unit according to claim 1, wherein a hub exterior of a hub of said drive wheel is designed, at least in part, to be sloped in an axial direction, said hub exterior, at least in part, in a first region of said hub facing said screw conveyor, being designed as sloped axially outwards towards said screw conveyor so as to prevent blocking of crop in front of said drive wheel.

14. The drive unit according to claim 1, wherein a hub exterior of a hub of said drive wheel is designed, at least in part, to be sloped, said hub exterior, at least in part, in a second region of said hub facing away from said screw conveyor, being designed as sloped axially outwards away from said screw conveyor so as to prevent jamming of crop in said drive wheel.

15. The drive unit according to claim 1, wherein said drive wheel further comprises at least one washer disc connected at an end of the at least one washer disc to said first retainer, said at least one washer disc protruding outwards in a radial direction beyond said first retainer in such a way that said continuous tension device mounted on said drive wheel is guided in an axial direction.

16. The drive unit according to claim 15, wherein a second retainer is disposed on said at least one washer disc which is not directly held by at least one of said arms, said second retainer being disposed on the same perimeter as the first retainer directly held by said arms.

17. The drive unit according to claim 1, wherein guide cams protruding radially outwards are disposed on said first retainer, said guide cams being able to engage in openings on said continuous tension device for synchronizing said drive wheel and said continuous tension device.

18. The drive unit according to claim 1, wherein said drive wheel is mounted, resistant against rotation, on a shaft of said screw conveyor.

19. A grain elevator arrangement, comprising a grain elevator and the drive unit according to claim 1, said drive wheel of said drive unit engaging with said continuous tension device of said grain elevator in friction and/or a positive locking connection in such a way that any rotation of said screw conveyor as well as said drive wheel operatively connected thereto also drives said continuous tension device, whereby, hereby, crop conveyed by said screw conveyor into said grain elevator may be conveyed by said paddles on said continuous tension device through said grain elevator, whereby said several openings enable and/or facilitate a flow of crop conveyed by said screw conveyor into said grain elevator through said drive wheel.

20. The grain elevator arrangement according to claim 19, wherein said continuous tension device is designed as a cam belt provided with cams and gaps located in-between, said cams being able to engage with gaps between said first retainer in a positive locking manner so as to retain said cams of said cam belt by said drive wheel to thereby drive said cam belt of said grain elevator.

21. The grain elevator arrangement according to claim 19, wherein said continuous tension device is designed as a flat belt being frictionally engaged with said first retainer of said drive wheel so as to retain said flat belt to thereby drive said flat belt of said grain elevator.

* * * * *